No. 648,705.  
A. L. PARCELLE.  
SPEED INDICATOR.  
(Application filed June 25, 1898.)  
(No Model.)  
Patented May 1, 1900.
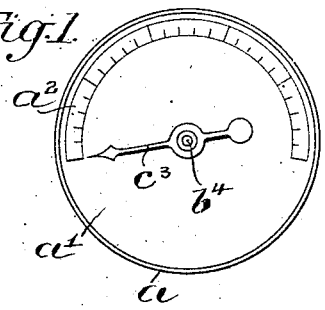
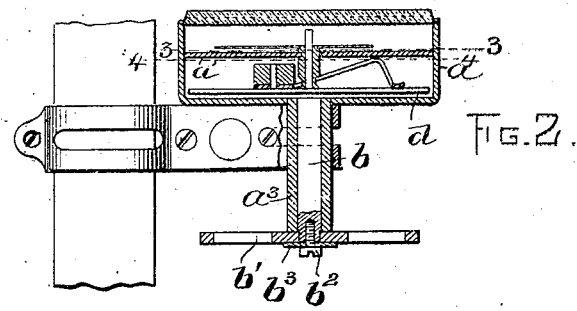
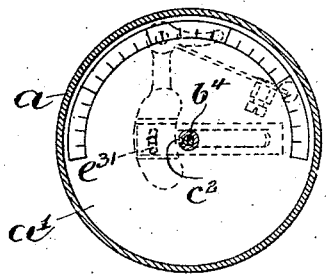
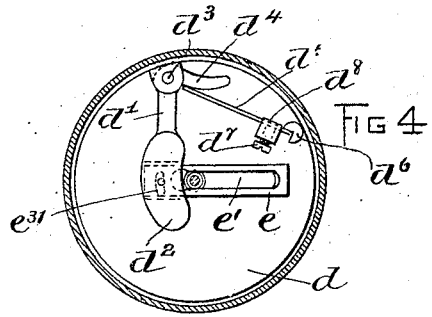
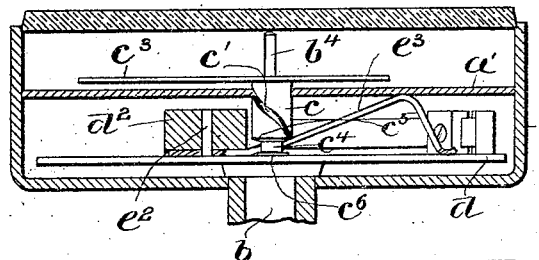
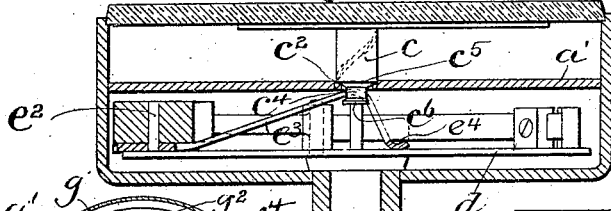
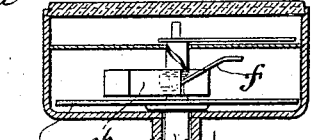
WITNESSES:  
A. D. Harrison  
P. W. Pezzetti
INVENTOR:  
A. L. Parcelle  
by Wright, Brown & Quimby  
Attys.

UNITED STATES PATENT OFFICE.

ALBERT L. PARCELLE, OF BOSTON, MASSACHUSETTS, ASSIGNOR TO THE SPEED METER MANUFACTURING COMPANY, OF PORTLAND, MAINE.

SPEED-INDICATOR.

SPECIFICATION forming part of Letters Patent No. 648,705, dated May 1, 1900.

Application filed June 25, 1898. Serial No. 684,487. (No model.)

*To all whom it may concern:*

Be it known that I, ALBERT L. PARCELLE, of Boston, in the county of Suffolk and State of Massachusetts, have invented certain new and useful Improvements in Speed-Indicators, of which the following is a specification.

This invention has relation to instruments for measuring or indicating the speed of rotation of a shaft or other body, and has for its object to provide certain improvements in the same whereby the device may be rendered more simple in construction and more accurate than heretofore.

The invention consists of a speed-indicator of the type illustrated in my patent numbered 586,318, dated July 13, 1897, and possessing certain features of construction and relative arrangement of parts, all as illustrated upon the drawings and now to be described in detail and finally pointed out in the claims hereunto appended.

Reference is to be had to the accompanying drawings, and to the letters marked thereon, forming a part of this specification, the same letters designating the same parts or features, as the case may be, wherever they occur.

Of the drawings, Figure 1 represents in face view a speed-indicator embodying my invention. Fig. 2 represents a section through the same. Fig. 3 represents a section on the line 3 3 of Fig. 2. Fig. 4 represents a section on the line 4 4 of Fig. 2. Figs. 5 and 6 are enlarged sections showing the position of the parts when the device the speed of which is being measured is traveling at its lowest and its highest rates of speed, respectively. Figs. 7 and 8 illustrate another embodiment of the invention.

In carrying out my invention I employ a suitable casing $a$, in which is rigidly secured a dial-plate $a'$, on which is marked a graduated scale $a^2$, representing miles and fractions thereof. The casing $a$ is rigidly secured to a tubular stem $a^3$, through which projects an arbor $b$, to which is rigidly secured a wheel $b'$ by means of a screw $b^2$ and a washer $b^3$. If the instrument be employed for indicating the speed of a bicycle, for instance, the wheel $b'$ is so arranged as to be rotated by one of the bicycle-wheels, whereby its speed of rotation varies with the speed of rotation of the said bicycle-wheels.

Projecting out from the end of the arbor $b$ is a pin or stud $b^4$, on which is loosely mounted a sleeve, barrel, or hub $c$, to be hereinafter described in detail. To the arbor $b$ is rigidly secured a disk $d$, which lies close to the bottom of the casing, as shown in Figs. 5 and 6, and upon the outer face of this disk $d$ is pivoted an arm $d'$, having on its end a weight $d^2$, the pivot-pin $d^3$ of the said arm being near the edge of the disk and the arm being under normal conditions in the position shown in Fig. 3. Extending laterally from the pivoted end of the arm $d'$ is a curved spur or projection $d^4$, the convex face of which bears against one end of a flat spring $d^5$, the opposite end of which is held against a stud $d^6$ on the disk by a set-screw $d^7$, extending through a lug $d^8$, bent up from the face of the disk. By adjusting the screw $d^7$ the tension of the spring $d^5$ may be varied. For convenience I term the curved surface of the spur or projection $d^4$ a "compensating cam," and by its means I secure a differential spring action.

In the normal position of the parts shown in Fig. 3 the free end of the spring $d^5$ acts upon the inner portion of the convexly-curved surface of the spur or projection $d^4$. As the arm $d'$ swings outwardly under the influence of centrifugal force this movement of the said arm brings successively into contact with the spring $d^5$ portions of the curved surface of the said projection $d^4$ which are farther and farther removed from the pivot $d^3$. Thus the spring $d^5$ becomes more and more effective in its action and its pressure upon the said spur or projection $d^4$ increases, partly because of the decreased leverage and partly because the said spring becomes shorter, and hence its resistance increases. By this arrangement I am enabled to utilize the scale $a^2$ with uniform gradations, substantially as described in my said prior patent.

The hub or barrel $c$ projects through an aperture in the center of the scale-plate $a'$, and it is provided with a spiral cam-groove $c'$, into which a lug $c^2$ on the scale or dial plate $a'$ projects, as shown in Fig. 4. To the projecting end of the hub $c$ is secured an index or pointer $c^3$, which is adapted to coact with the scale in indicating the speed of travel of the bicycle. The inner end of the hub or barrel is reduced, as at $c^4$, and has a shoulder $c^5$, the said reduced portion $c^4$ lying in the slot $e'$ of an elongated bar $e$, whose one end is connected to the weight $d^2$ by a pin $e^2$, projecting into a transverse recess $e^{31}$ in the weight $d^2$. This bar $e$ is bent at $e^3$ and its free end $e^4$ rests upon the outer face of the disk $d$ and holds the main portion of the bar in an inclined position relatively to the plane of said disk.

When the parts are motionless and the weight $d^2$ is in the position shown in Fig. 3, the bar $e$ lies in the position shown in Fig. 5; but when the disk $d$ is rotated sufficiently to cause the weight $d^2$ to be swung outward by centrifugal force the said weight draws along the bar $e$, the longer inclined portion of which operates as a wedge or lifting-cam. Said wedge bears on the shoulder $c^5$ of the loose hub or barrel $c$ and moves the latter axially along the stud $b'$, and by reason of the lug $c^2$ projecting into the cam-groove $c'$ therein the hub $c$ is partially rotated as it moves upward and the end of the pointer $c^3$ traverses the scale $a^2$. As the speed of the rotating part increases the weight $d^2$ is thrown upward farther and farther, causing the wedge to force the hub upward to the same degree, whereby the hub is caused to turn more and more for the purpose of indicating the speed through the medium of the pointer and the scale. When the speed of the rotating part slackens, the spring $d^5$, operating upon the spur $d^4$, returns the weight $d^2$ gradually to its normal position and the under side of the bar $e$, bearing upon the shoulder $c^6$ of the said hub $c$, returns the latter and the pointer to their normal positions.

It will be seen that by my improvements I have materially simplified the construction and reduced the number of parts, those employed being easily constructed and few in number.

The indicator is adapted to work easily and without interfering at all with the rotation of the bicycle-wheels or the other moving devices the speed of which is to be measured.

It is evident that many changes may be made in the details of construction of the instrument. For instance, in Figs. 7 and 8 I have illustrated another embodiment of the invention, which I sometimes find preferable to employ by reason of its simplicity and minimum number of parts. It differs from the speed measure above described in that the wedge $f$ is formed integrally with the weighted arm $f'$ and does not rest upon the rotating disk $d$. The arm $f'$ is pivoted at $f^2$ to the disk, and the slot $f^3$ in the wedge is an arc concentric with the pivot, as clearly shown in Fig. 7. The spring $g$ bears against a flattened stud $g'$, projecting up from the disk $d$, and is connected by an adjustable screw $g^2$ with the shorter end $f^4$ of the arm $f'$, which extends beyond the pivot $f^2$. The arm $f'$ is so shaped that its outer edge $f^5$ is convexly curved, like the spur $d^4$ above described, and consequently it provides a compensating cam to bear against the spring $g'$. Hence when the weight $f^6$ is thrown outward by centrifugal force the tension of the spring is gradually increased in the same manner, as previously set forth. The end $f^4$ of the arm $f'$ is reduced or "slabbed off," so that there is a V-shaped space between the end of the spring and the outer edge of the said end, whereby the spring normally bears against the arm at a point opposite the pivot $f^2$. By tightening the screw to draw the end of the spring closer to the end of the arm the tension of the spring will be increased and by loosening the screw the tension will be decreased. The other features of the instrument are substantially similar to those of the speed-indicator shown in Figs. 1 to 6, inclusive, and the operations of the two devices are substantially similar.

Having thus explained the nature of the invention and described a way of constructing and using the same, though without attempting to set forth all of the forms in which it may be made or all of the modes of its use, I declare that what I claim is—

1. A speed-indicator comprising indicating mechanism, a rotatory arbor, a weighted arm carried pivotally by said arbor and adapted to swing away from the center of rotation by centrifugal force, and an inclined bar connected to said arm to move therewith for actuating the indicating mechanism.

2. A speed-indicator comprising a rotatory arbor, a weighted arm carried pivotally by said arbor and adapted to swing away from the center of rotation by centrifugal force, an inclined bar connected to the said arm to move laterally therewith, a hub or sleeve controlled by said inclined bar, and an index connected to said hub.

3. A speed-indicator comprising a rotatory arbor, a weighted arm carried pivotally by said arbor and adapted to swing away from the center of rotation by centrifugal force, a stationary projection, a hub or sleeve having a helical cam-slot to receive said projection, and mechanism connected to said weighted arm and including a slide movable transversely of said arbor, for moving said hub axially.

4. A speed-indicator comprising a rotatory arbor, a weighted arm carried pivotally by said arbor and adapted to swing away from the center of rotation by centrifugal force, a stationary projection, a hub having a helical cam-slot to receive said projection, and an inclined bar connected to said arm to move therewith and adapted to move said hub axially.

5. A speed-indicator comprising a rotatory arbor, a weighted arm carried pivotally by said arbor and adapted to swing away from the center of rotation by centrifugal force a stationary scale-plate having a lug, a hub having a helical cam-slot to receive said lug, and an inclined bar connected to the weighted arm and adapted to act on the hub to move it axially.

6. A speed-indicator comprising a rotatory arbor, a weighted arm carried pivotally by said arbor and adapted to swing away from the center of rotation by centrifugal force, indicating mechanism, and a bar connected to said arm to move laterally therewith for actuating said mechanism, said bar being formed to act as a wedge.

7. A speed-indicator comprising a rotatory arbor, a weighted arm carried by said arbor and adapted to swing away from the center of rotation by centrifugal force, a wedge or inclined bar formed integrally with said arm to swing therewith, and mechanism actuated by said wedge for indicating the relative positions thereof.

8. A speed-indicator comprising a rotatory arbor, a pivoted weighted arm carried by said arbor and adapted to swing away from the center of rotation by centrifugal force, a curved inclined bar carried by said arm and extending laterally from the free end thereof, and mechanism actuated by said bar for indicating the relative positions thereof.

9. A speed-indicator comprising a rotatory arbor, a centrifugally-operated arm having a weight at or near one end and a pivot near the other end thereof, said arm having its outer edge between the weight and the pivot convexly curved to form a compensating cam, and a leaf-spring bearing against said compensating cam.

10. A speed-indicator comprising a rotatory arbor, a centrifugally-operated arm having a weight at or near one end and a pivot near the other end thereof, said arm having its outer edge between the weight and the pivot convexly curved to form a compensating cam, a spring bearing against the said cam and projecting beyond the pivot and a screw connecting the said projecting end of the spring with the end of the arm.

11. A speed-indicator comprising a rotatory arbor, a centrifugally-operated arm having a weight at or near one end and a pivot near the other end thereof, said arm having its outer edge between the weight and the pivot convexly curved to form a compensating cam, and having its end on the other side of the pivot reduced or cut away, a spring bearing against the said cam edge, and having an end projecting beyond the said pivot, and an adjustable screw connecting the projecting end of the spring with the reduced end of the arm.

In testimony whereof I have affixed my signature in presence of two witnesses.

ALBERT L. PARCELLE.

Witnesses:
  M. B. MAY,
  P. W. PEZZETTI.